United States Patent
Eldridge et al.

(10) Patent No.: US 6,430,601 B1
(45) Date of Patent: Aug. 6, 2002

(54) MOBILE DOCUMENT PAGING SERVICE

(75) Inventors: Margery A. Eldridge, Great Shelford; Michael J. Flynn, Milton; Christopher M. Jones, Trumpington; Michiel F. E. Kleyn, London; Michael G. Lamming, Cambridge; David L. Pendlebury, Wigan Lancs, all of (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/270,645

(22) Filed: Mar. 16, 1999

(30) Foreign Application Priority Data

Sep. 30, 1998 (GB) .............................. 9821104

(51) Int. Cl.[7] .............................................. G06F 15/16
(52) U.S. Cl. ...................................................... 709/206
(58) Field of Search ............................... 709/245, 242, 709/231, 204, 206, 225

(56) References Cited

U.S. PATENT DOCUMENTS

| | | | | |
|---|---|---|---|---|
| 5,555,376 A | | 9/1996 | Theimer et al. ........ | 395/200.09 |
| 5,862,321 A | * | 1/1999 | Lamming et al. ........ | 395/200.3 |
| 5,870,089 A | * | 2/1999 | Fabbio et al. ............ | 345/335 |
| 6,034,621 A | * | 3/2000 | Kaufman ................ | 340/825.44 |
| 6,138,158 A | * | 10/2000 | Boyle et al. ............. | 709/225 |
| 6,230,156 B1 | * | 5/2001 | Hussey ................... | 707/10 |
| 6,240,445 B1 | * | 5/2001 | Kumar et al. ............ | 709/206 |

FOREIGN PATENT DOCUMENTS

| | | |
|---|---|---|
| EP | 0 691 619 A2 | 1/1996 |
| GB | 2 296 115 A | 6/1996 |
| WO | WO 96/19064 | 6/1996 |

OTHER PUBLICATIONS

Schilit, Bill et al., "Context–Aware Computing Applications", published in *Proceedings Workshop on Mobile Computing Systems and Applications*, IEEE, Dec. 1994, and in Technical Report CSL–94–12, Xerox Palo Alto Research Center, Nov. 1994.

U.S. patent application Ser. No. 09/118,221 entitled "Token–Based Document Transaction Systems" to Margery A.. Eldridge et al., filed Jul. 17, 1998.

U.S. patent application Ser. No. 09/118,322 entitled "Token–Based Document Transactions" to Margery a. Eldrildridge et al., filed Jul. 17, 1998.

(List continued on next page.)

*Primary Examiner*—Glenton B Burgess
*Assistant Examiner*—Kimberly D Flynn (57) ABSTRACT

A method and a system are presented for transmitting document references or tokens to users of integrated wireless and wire-based communication services. The system includes workstations, files servers, printers and other devices coupled to a wire-based network. Mobile computing devices are coupled to the wire-based network through either IR (infrared) or RF (radio) transceiver gateways. Each mobile computing device appears to hold a user's personal collection of documents: the device is programmed to receive, transmit, and store document tokens. A document services request available to users of the portable devices is a document paging service. Using this service, a process operating on a repository of shared documents monitors for changes to specified files or file locations. Identification of changes made to documents on the repository of shared documents results in the transmission of a document token to selected users of the mobile computing devices identifying the changes. Once the document token identifying the changed document on the repository of shared documents is received, the document referenced by the document token is readily printed, displayed, or forwarded using available document services.

18 Claims, 8 Drawing Sheets

OTHER PUBLICATIONS

U.S. patent application Ser. No. 09/118,598 entitled "Context-Sensitive Document Transactions" to Margery A. Eldridge et al., filed Jul. 17, 1998.

Want, Roy et al., "The PARCTAB Ubiquitous Computing Experiment," published in Technical Report CSL–95–1, Xerox Palo Alto Research Center, Mar. 1995 and in IEEE Personal Communications, Dec. 1995.

Edwards, Morris, "Wireless Services Struggle with Protocols, User Acceptance," IAC Access No. 01861387 & Communications News, vol. 32, No. 10, Oct. 1995, p. 64.

* cited by examiner

MOBILE DOCUMENT PAGING SERVICE

CROSS-REFERENCE TO RELATED APPLICATIONS

Cross-reference is made to U.S. patent applications Ser. No. 09/270,641, entitled "System For Generating Context-Sensitive Hierarchically Ordered Document Service Menus", Ser. No. 09/270,320, entitled "Secure Token-Based Document Server", and Ser. No. 09/270,451, entitled "Mobile Email Document Transaction Services", which are all assigned to the same assignee as the present invention and hereby incorporated by reference.

BACKGROUND OF THE INVENTION

1. Field of the Invention

The present invention relates generally to a system for performing document services on mobile computing devices, and more particularly, to a system for alerting users of the mobile computing devices of updates to documents stored in a shared document repository using document tokens.

2. Description of Related Art

While the use of mobile computing devices is becoming more prevalent among mobile workers, transfer of document information between mobile computing devices is often limited due to inadequate storage capacity on such devices or due to inadequate communication channel bandwidth. To overcome these limitations, many mobile workers carry a laptop computer with them while traveling. Although laptop computers are increasingly smaller and lighter, their functionality, which is designed to meet the requirements of office-based document work, is determined largely by the desktop machines from which they evolved. Powerful editors and spreadsheet applications, for example, that are essential in certain office-based work environments have limited utility while away from the office. In some circumstances, mobile workers carry laptop computers simply to be able to access their documents, and not necessarily to create or edit them.

One mobile document transaction service for overcoming these limitations is disclosed in U.S. Pat. No. 5,862,321 (published also as European Patent Application EP 691,619 A2). More specifically, U.S. Pat. No. 5,862,321 (entitled: "System and Method for Accessing and Distributing Electronic Documents") discloses a system for transferring between computers document identifiers that represent a particular document, rather than the document itself. This system can include any number of workstations, file servers, printers and other fixed devices (including multifunction devices) coupled to a network, as well as a number of mobile computing devices carried by users and coupled to the network by an infrared (IR) or radio (RF) link. Each mobile computing device appears to hold a user's personal collection of documents, with the devices being programmed to receive, transmit, and store document identifiers (e.g., a URL—"Uniform Resource Locator") or document tokens, as defined herein.

Each document token is associated with an electronic document stored in an electronic repository or database. The mobile document transaction service effectively distributes references to documents between mobile computing devices by transmission of document tokens, rather than the documents themselves. For example, a document can be sent to an IR transceiver equipped network printer by "beaming" a document token, which references the document, from a mobile computing device to the network printer. The network printer retrieves the complete document referenced by the document token, and immediately prints a copy of the document. Thus, to a user of the mobile document transaction service, documents are seamlessly passed between users and output or input to devices coupled to networks as expansive as the Internet. Since the document references are small and defined, the documents that they reference can have an arbitrary size and not impact the performance of the mobile computing devices. Advantageously, token based document references can be passed between two mobile computing devices without having to transmit large amounts of data.

Users of mobile computing devices often operate in a collaborative setting where they are required to share a collection of documents that is stored in a central repository. These documents often set forth information that is updated and managed by one or more persons with access to the central repository. Once updated, the documents must be distributed as quickly as possible to the mobile users. Accordingly, it would be desirable to provide a system that automatically notifies mobile users of updates to documents stored at the central repository. Furthermore, it would be desirable that such a system provide the mobile users with means for utilizing available document services to either print, display, or forward the updated documents upon receipt of such notification. Such a system would advantageously eliminate the need for users of mobile computing devices to check whether changes have been made to information stored at the central repository. In addition, such a system would advantageously enable the users of the mobile computing devices to utilize document services available on wire-based networks without ever having to retrieve the updated information received from the central location to their mobile computing device.

SUMMARY OF THE INVENTION

In accordance with the invention there is provided a method and apparatus therefor, for operating a token-enabled server coupled to a network. The token-enabled server receives a first set of data identifying a set of mobile computing devices. The first set of data provides the token-enabled server with addresses for communicating with each mobile computing device in the set of mobile computing devices over a wireless communications transceiver system. The token-enabled server receives a second set of data identifying a set of document elements. The set of document elements received by the token-enabled server defines locations of documents stored on the network. Subsequently, the token-enabled server defines a lookup table using the first set of data and the second set of data. The lookup table is used to associate at least one document element in the set of document elements with at least one address identifying one of the mobile computing devices in the set of mobile computing devices. The token-enabled server then spawns a process for monitoring modifications to documents identified by the set of document elements. Using the spawned process, the token-enabled server observes modifications to the documents identified by the set of document elements. In response to observing modifications to the documents, the token-enabled server transmits a notification message to each mobile computing device associated with the document element corresponding to the modified document using the lookup table.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

A. Operating Environment

Figure 1:
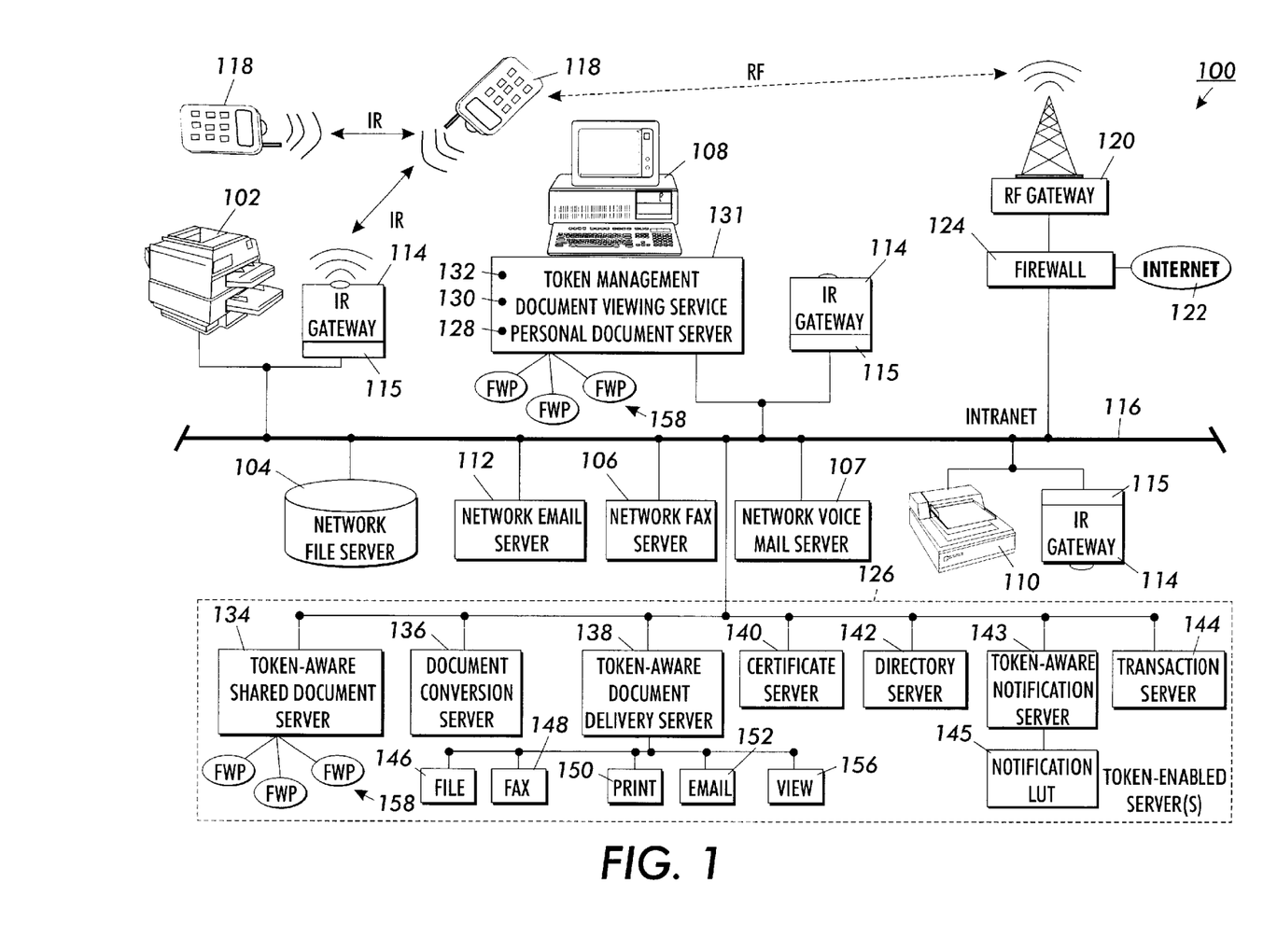
FIG. 1 illustrates a distributed operating environment for performing the present invention.

Referring now to the drawings where the showings are for the purpose of describing the invention, FIG. 1 illustrates a distributed operating environment 100 for performing the present invention. The distributed operating environment includes a plurality of network devices for providing document services. The network devices, which are coupled to wire-based networks 116 and 122, include a printer 102, a file server 104, a network fax server 106, a network voice mail server 107, a personal workstation 108, a scanner 110, and a network email server 112. Generally, these as well as other network devices not shown, communicate using Intranet 116 and gain access to Internet 122 through firewall 124. The network devices communicate over the wire-based networks 116 and 122 using well-known network communication protocols such as TCP/IP.

In addition, FIG. 1 shows mobile computing devices 118. The mobile computing devices 118 are bridged to the wire-based networks 116 and 122 through either IR gateways 114 or RF gateway 120. Such mobile computing devices communicate with each other or other wire-based or wireless devices using either an IR (Infrared) or a radio (RF) transceiver. An example of such a mobile computing device is the Nokia© 9000 Communicator, which is sold by the Nokia Company. The RF transceiver operates over any suitable wireless network such as PCS, GSM, or pager messaging. The IR transceiver uses, for example, communication standards set by the infrared data association (IRDA).

To seamlessly integrate document services across wireless and wire-based networks, the wire-based network is further populated with token-enabled server(s) 126, personal token-enabled workstation elements 131, and IR gateway context insertion slivers 115. These elements operate together in the distributed operating environment to provide users of the mobile computing device 118 with streamlined access to document services available on wire-based networks 116 and 122. Users of token-enabled mobile computing devices 118 are capable of browsing through directories of document tokens. These document tokens represent a user's documents stored on wired-based networks 116 or 122. In addition, using token-enabled mobile computing devices, the user is able to apply document services available on networks 116 or 122 to selected document tokens.

Token-enabled mobile computing devices are further described in the following patent applications, which are hereby incorporated by reference: U.S. Pat. No. 5,862,321 (entitled: "System and Method for Accessing and Distributing Electronic Documents"), U.S. patent application Ser. No. 09/118,598 (entitled: "Context-Sensitive Document Transactions"), U.S. patent application Ser. No. 09/118,322 (entitled: "Token-Based Document Transactions") and U.S. patent application Ser. No. 09/118,221 (entitled: "Token-Based Document Transaction Systems"). In addition, further background information relating to network protocols is disclosed by Tanenbaum in "Computer Networks," ISBN 0-13-349945-6.

B. Token-Enabled Server

The token-enabled server 126, which operates on the wire-based networks 116 and 122, communicates with network devices indicated by reference numbers 102, 104, 106, 107, 108, 110, and 112, as well as, the RF and IR gateways 114 and 120. The token-enabled server 126 includes token-aware services or servers 134, 136, 138, 140, 142, and 144. These token-aware services can either be operating centrally on token-enabled server 126 or individually on servers distributed over Intranet 116 or Internet 122. The services provided by the token-enabled server(s) 126 are shared between a plurality of users of the mobile computing devices 118.

Transmissions from the mobile computing device 118 are routed through one of the gateways 114 or 120 to transaction server 144. The transaction server 144 is adapted to manage transaction requests from mobile computing devices 118 that involve requests for document services available on networks 116 and 122. The directory server 142 maintains a database of token-enabled devices (e.g., printer 102 and scanner 110). The transaction server 144 communicates with the directory server 142 to look up parameters for satisfying document delivery requests from the mobile computing devices 118. For example, the directory server contains information that relates a particular IR transceiver 114 to its associated network device such as printer 102.

In addition, the transaction server 144 communicates with the token-aware document delivery servers 138 and 128. The token-aware document delivery servers 138 and 128 accept document tokens and retrieve the document that the token represents. Document tokens reference documents stored on the token-aware shared document server 134, the token-aware personal document server 128, or other file servers located on the Intranet 116 and the Internet 122 (e.g., network file server 104). Effectively, any mobile computing device 118 can communicate either directly or indirectly with the token-aware document servers 134 and 128.

One purpose of the token-aware document servers 134 and 128 is to function as an interface between token-enabled devices and services and non-token enabled file servers. That is, the token-aware document servers 134 and 128 are used to access a document identified in a document token when that document is stored on a file server that is not token-enabled. Examples of file services that are not token enabled include the Windows NT file service (a product of Microsoft Corporation) and the NFS (Network File System) file service.

A document token (also referred to herein as document references) is a superset of a Uniform Resource Locator (URL) because document tokens include security elements for authentication. Advantageously, document tokens may also reference documents on any standard web server operating on Intranet 116 or Internet 122. It will be appreciated by those skilled in the art, however, that a standard web server does not recognize secure token transactions, and therefore any security elements of tokens are disregarded by the standard web server. An example of a token-aware document server which supports secure token transactions is disclosed in U.S. patent application Ser. No. 09/270,320, entitled "Secure Token-Based Document Server".

If necessary, the token-aware document delivery server 138 requests that the conversion server 136 convert retrieved documents into an appropriate format. The conversion server 136 converts documents between a number of different document formats such as Microsoft Word, Postscript, and bitmap formats. Interchanging documents between various different formats is known as disclosed, for example, in U.S. Pat. No. 5,210,824.

After retrieving and formatting a document referenced by a document token, the token-aware document delivery server 138 delivers the formatted document to a driver or interface for accessing one of the document processing devices located on Intranet 116 (e.g., printer 102 or personal workstation 108). The drivers or interfaces available on the token-aware document delivery server 138 include a filing interface 146, a fax driver 148, a print driver 150, an email interface 152, or a viewing driver 156. In an alternate embodiment (not shown), the token-enabled server 126 includes a document capture server, which stores and allows access to documents received from input devices such as scanner 110 and fax server 106.

The network gateways 114 and 120, the transaction server 144, the token-aware document delivery server 138, and the token-aware document servers 134 and 128 communicate with the certificate server 140 which stores a list of public keys of users. In requesting a public key from the certificate server 140, a requesting token-enabled server submits a hint of a user's public key. In return, the certificate server 140 supplies a certificate, which contains the user's public key as well as a well-known public key that can be used to authenticate the certificate. In addition, the certificate server 140 can support standard certificates such as the X509 certificates from Verisign Incorporated.

The difference between a token-aware shared document server 134 and a token-aware personal document server 128 is that the shared document server 134 is capable of authenticating requests to fetch documents identified in document tokens using many different key pairs. In contrast, the personal document server 128 may only authenticate requests with one or two key pairs, such as a device key from the mobile computing device 118 and the personal workstation 108. Accordingly, the shared document server 134, unlike the personal document server 128, is adapted to accommodate a number of users operating on Intranet 116.

C. Token Elements on Personal Workstations

Operating on personal workstation 108 are token-enabled personal workstation elements 131, which include a document token management service 132, a token-aware document viewing service 130, and a token-aware personal document server 128. Any combination of these elements may operate on one or more personal workstations 108. The token-aware personal document server 128 provides users operating a mobile computing device 118 with access to documents stored on the particular workstation operating on networks 116 or 122. The token-aware document viewing service 130 provides users of mobile computing devices 118 with the capability of beaming document tokens to the personal workstation 108 and viewing the documents referenced by the document tokens. The document token management service 132 provides a facility for creating document tokens for documents stored, for example, on personal workstation 108 or network file server 104.

D. Token-Enabled IR and RF Gateways

The token-enabled server 126 offers a plurality of document services to users of mobile computing devices 118 through either IR gateway 114 or RF gateway 120. When the gateway 114 receives a document transaction service request from a proximately located mobile computing device 118, the IR gateway 114 forwards the request to the transaction server 144 over Intranet 116. The IR gateway can either be embedded in or be intimately associated with a device that offers document services. For example, the printer 102 shown in FIG. 1 is intimately associated with an IR gateway 114.

Before forwarding the document service request, the IR gateway context insertion sliver 115 authenticates the request using the certificate server 140 and appends context information to the request. Document service requests that arrive either from RF gateway 120 or Internet 122 are authenticated at firewall 124. Forming part of the RF gateway 120 is a dialup server for establishing connections between wire-based and wireless networks. Typically, such a dialup server establishes PPP connections with the mobile computing devices 118 and thereby provides a communication link with the token-enabled server 126 operating on network 116.

In order to establish a connection through a particular IR gateway 114, the IR port of the mobile computing device must have an unobstructed path and be within one meter of the IR gateway 114. In one embodiment when making a document service request, a mobile computing device 118 attempts to access an IR gateway 114 before attempting to access the RF gateway 120. When a mobile computing device 118 is unable to establish an IR connection, the mobile computing device 118 attempts to establish an RF connection over RF gateway 120. Thus, a user must consciously position the mobile computing device 118 proximate to an IR gateway in order to establish an IR link; otherwise by default, an RF link is established unless instructed not to by the user of the mobile computing device. To provide feedback to the user, a message of the status of attempted or established IR or RF connections is presented on a user interface of the mobile computing device.

E. Document Paging Service

E.1 Overview

Figure 2:
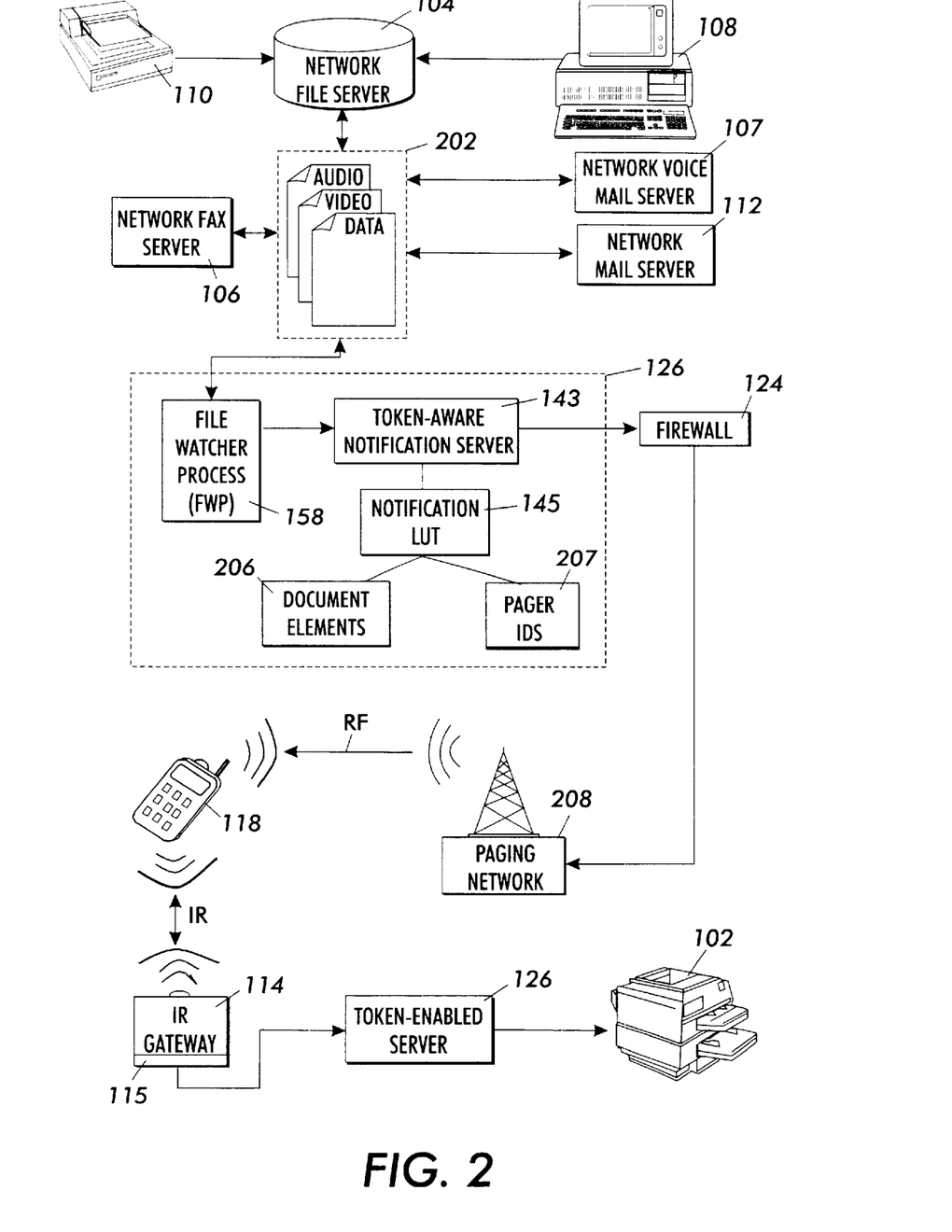
FIG. 2 illustrates the elements of the operating environment shown in FIG. 1 that are used to perform a mobile document paging service.
Figure 3:
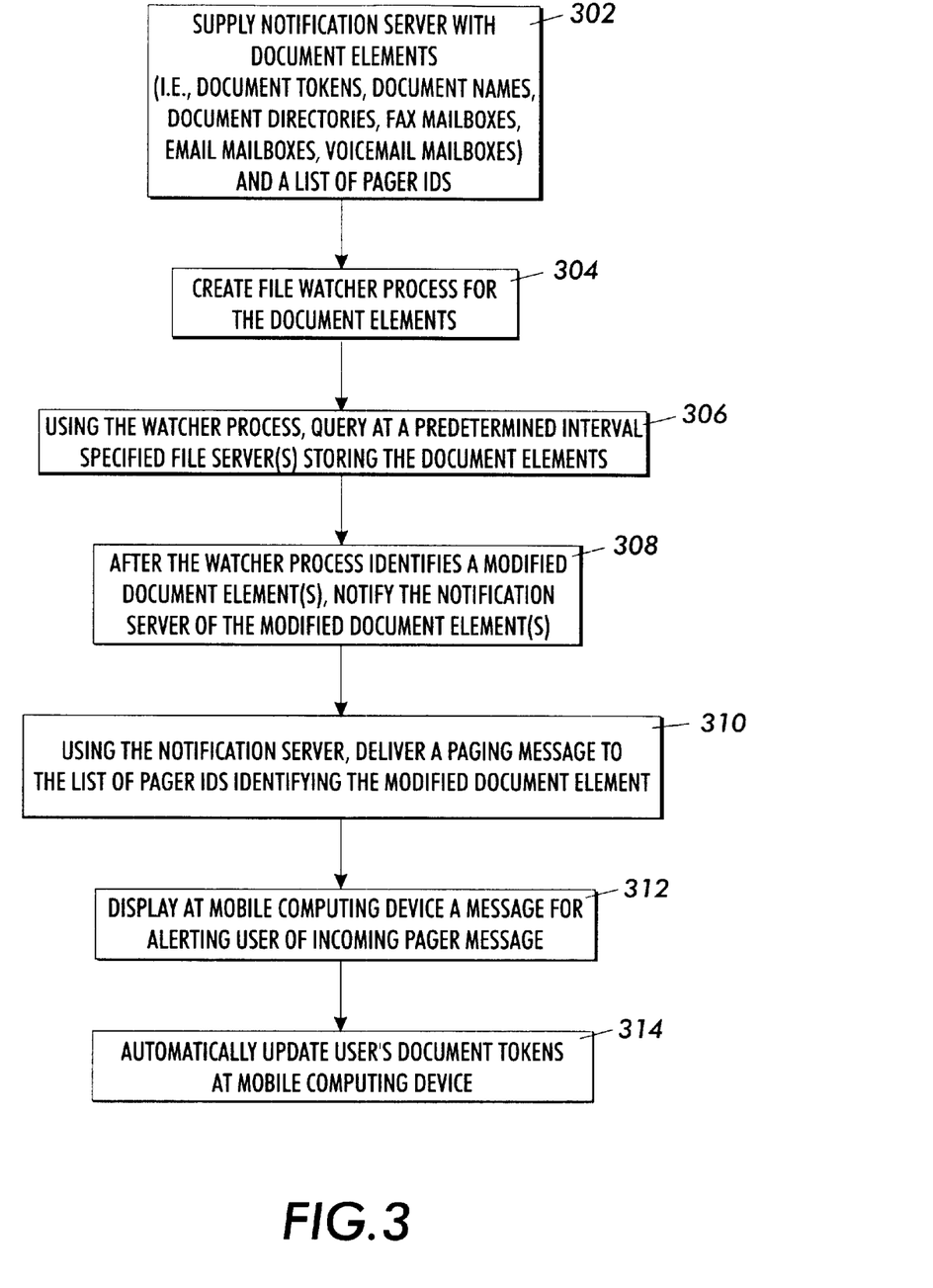
FIG. 3 sets forth the steps performed at a mobile computing device and a token-enabled server for carrying out the mobile document paging service.

FIGS. 2 and 3 illustrate an overview of a document paging service for carrying out the present invention. Specifically, FIG. 2 illustrates specific system elements of the distributed operating environment illustrated in FIG. 1, and FIG. 3 is a flow diagram which sets forth steps for performing one embodiment of the present invention. Generally, the purpose of the document paging service illustrated in FIG. 2 is to provide a system which alerts users of mobile computing devices 118 with paging messages. The paging messages alert users of the mobile computing devices 118 of modifications, additions, deletions of documents stored on a centralized or personal storage device.

Because the mobile computing devices 118 do not have sufficient storage capacity to retain a large number of documents, the mobile computing devices store document tokens. These document tokens identify documents stored on for example a wire-based network of file servers 104, fax servers 106, email servers 112, and voice mail servers 107. The Documents are originally created or edited using either scanner 110 or workstation 108. In addition, document can include video or audio data that is input through workstation 108 using a conventional microphone (not shown) or a video input port (not shown). Also, the network voice mail server 107 receives audio data over the conventional telephone network. The video-input port receives video from a digital video camera, for example. In addition, network fax server 106 can receive documents from conventional fax machines.

Initially, at step 302 shown in FIG. 3, a token-aware notification server 143, which forms part of the token-enabled server(s) 126 is supplied with a notification lookup table (LUT) 145 which includes document elements 206 and pager IDs 207. Each document element supplied at step 302 is associated with a set of pager IDs. Each Pager ID is an address of a mobile computing device, which in one embodiment is a phone number. When the token-enabled server 126 determines that a document element has been modified, the notification lookup table 145 is used to identify which pager IDs should be notified of the modifications identified by the token-enabled server 126. In one embodiment of the invention, the token-enabled server 126 automatically alerts users of mobile computing devices 118 with a paging message containing a document token of the identified modification. Advantageously, users of mobile computing devices are automatically notified of changes (edits, deletions, and additions) to documents stored in file space 202. File space 202 can be assigned access rights that are restricted (individual), limited (group), or unrestricted (open).

The document elements in the notification lookup table 145 include physical file locations of document data stored on networks 116 and 122. For example, the document elements in lookup table 145 can be defined using document tokens, document names, document directories, fax mailboxes, email mailboxes, or voicemail mailboxes in which document data is stored. The use of the term documents or document data is defined herein as data that includes a combination of any one or more of the following data types: textual data, graphics data, audio data, video data, or image data. In addition, documents may be compressed using either lossless or lossy compression schemes. The pager IDs, or more generally addresses, in lookup table 145 define numbers or addresses for accessing the mobile computing devices 118 over a wireless communications transceiver system. The wireless communications transceiver system or paging network 208 is adapted for sending paging messages from the token-enabled server 126 to the mobile computing device 118.

At step 304, a file watcher process (or processes) 158 is created for each entry or combination of entries in the notification lookup table 145. The file watcher process 158 monitors document elements in file space 202. The file space 202 may consist of a user's or group of users' document space, which can include an email inbox, shared workgroup directories, web realms, directories in which scanned documents are stored, or other organized file spaces. In addition to specifying the document elements 206, a user can also specify what actions the file watcher process 158 should watch for. For example in one embodiment, the file watcher process notifies the user upon the occurrence of one or more of the following actions: document additions, document edits, and document deletions.

At step 306, the file watcher process 158 queries at a predetermined interval the network file server 104, network fax server 106, network email server 112 and/or network voice mail server 107 that include file space 202 for storing the document elements specified at step 302. The step 306 is performed in order to determine whether changes have been made to the document elements. In an alternate embodiment, the file watcher process 158 registers with the file server 104 to receive notification of file or directory events. For example, file or directory events can include modifications, additions, or deletions of specified files or directories on the file server. Once the file watcher process 158 becomes aware of modifications to the specified document elements (either by polling or event updates), the file watcher process notifies the token-aware notification server 143 of the identified modifications, at step 308.

At step 310, the token-aware notification server 143 delivers a paging message to the list of pager IDs identifying the modified document element(s). More generally, the paging message is any message that can be sent from one computational element to another computational element coupled through a communication network. In one embodiment, the communication network is one that is capable of sending paging messages to mobile computing devices, such as the GSM digital network. Such a network is illustrated in FIG. 2 as paging network 208.

At step 312, the mobile computing device 118 receives a paging message over paging network 208. The paging message can take a variety of forms. For example, the paging messages may simply be text-based messages. Alternatively, the paging messages may embed commands for performing system operations on the receiving devices. Embedded commands may include automatically updating a user's document tokens, at step 314.

Once a paging message has been received in which a document has been modified, the user of the mobile computing device 118 can reproduce the document as modified by transmitting an appropriate document service request containing the document token through IR gateway 114 and token-enabled server 126 to printer 102. Advantageously, a user of a mobile computing device 118 is automatically notified of changes to document elements identified in file space 202. Furthermore, upon receipt of such a notification, the user of the mobile computing device is capable of reproducing the modified document without ever having to have retrieved the modified document onto the mobile computing device.

E.2 Document Paging Using Document Tokens

Figure 4A:
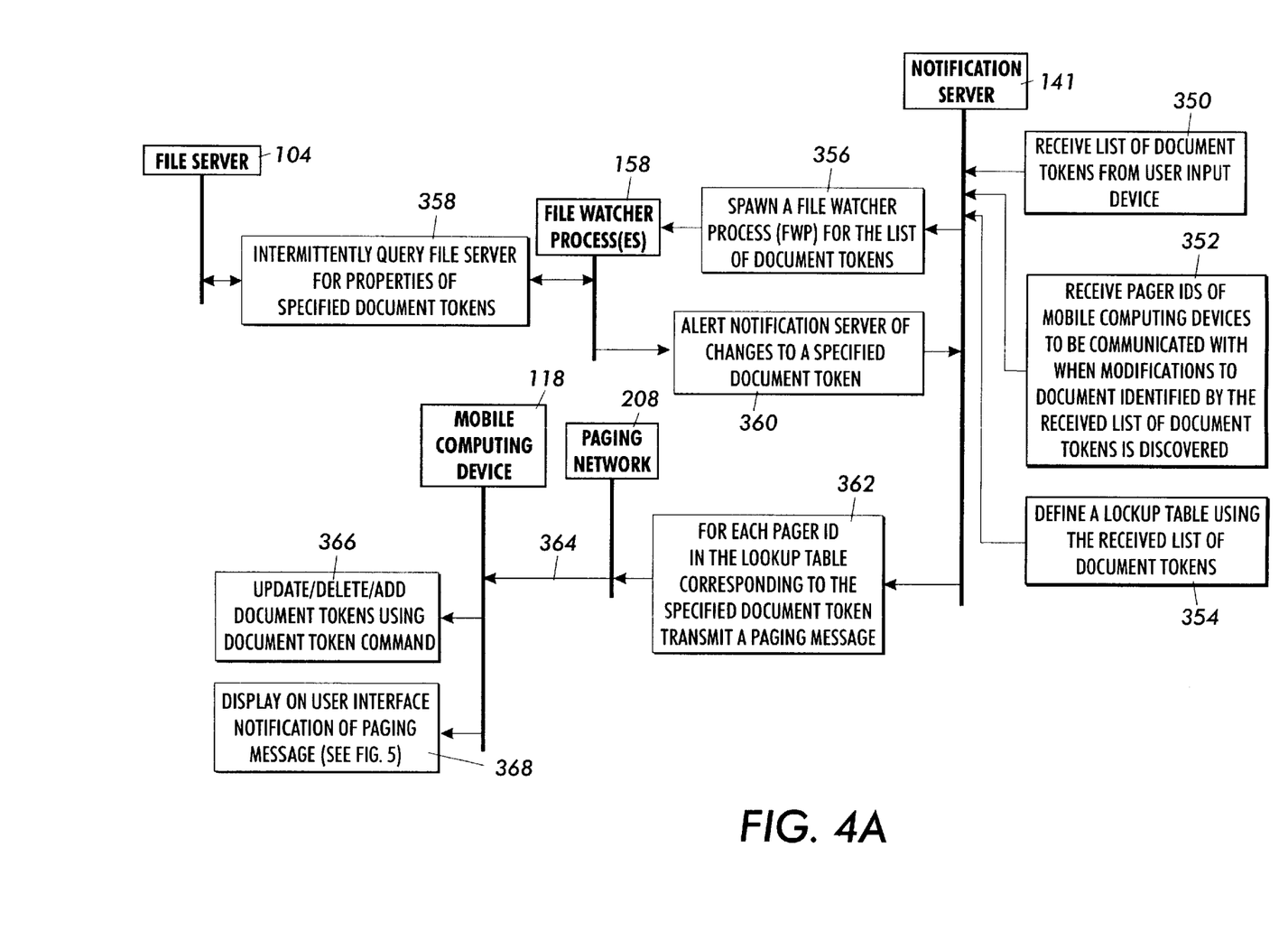
FIGS. 4A and 4B illustrate a detailed example of a communications protocol for notifying users of mobile computing devices with paging messages of updated document elements that are document tokens.
Figure 4B:
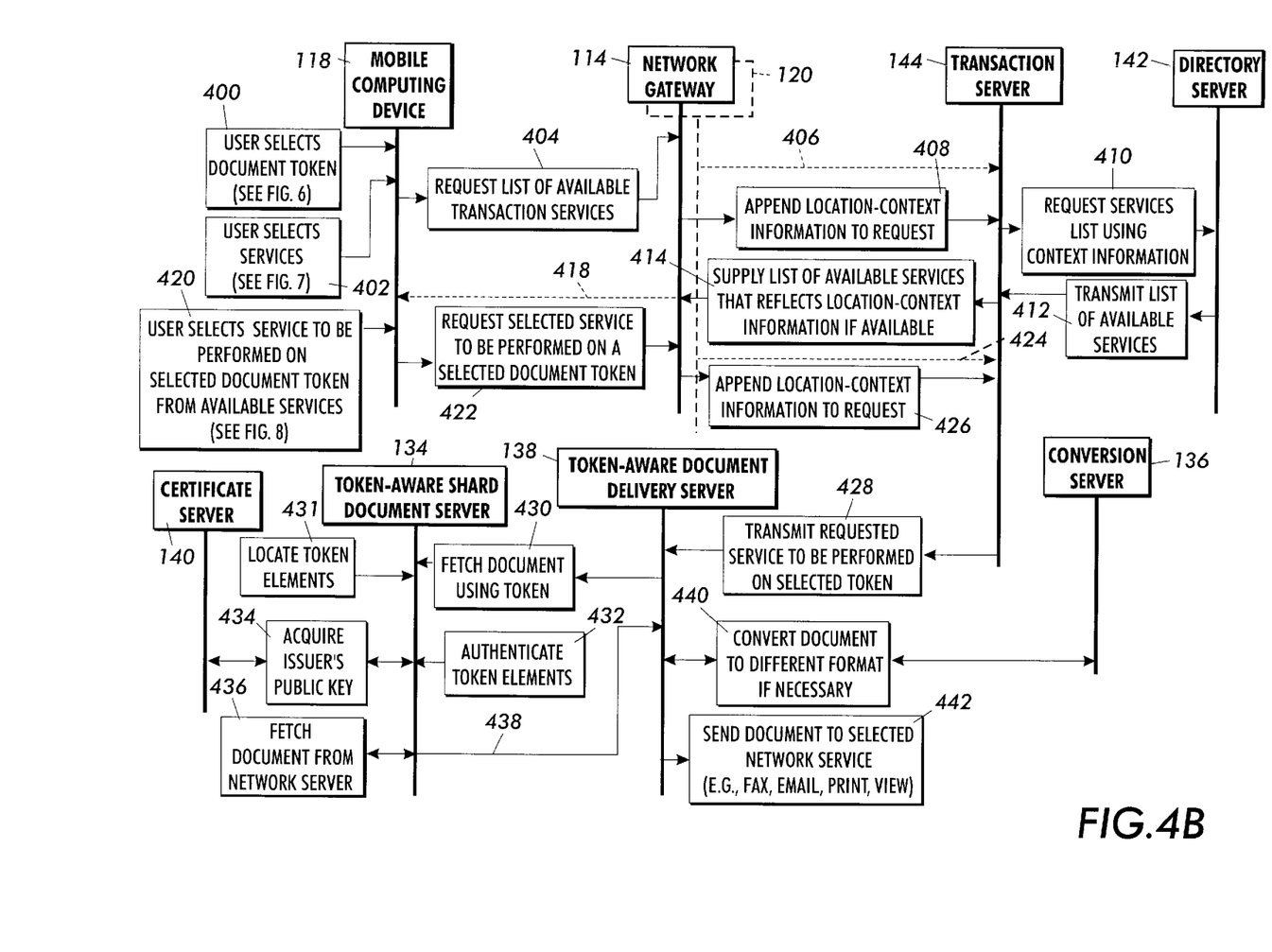

FIGS. 4A and 4B illustrate a detailed example of a communications protocol for notifying users of mobile computing devices with paging messages of updated document elements that are document tokens. Specifically, FIG. 4A illustrates setup and receipt of document paging messages for identifying modifications to specified documents, and FIG. 4B illustrates transactions performed for outputting the modified document to a specified document service.

As illustrated in FIG. 4A at action 350, the notification server 141 receives a list of document tokens from a user-input device (not shown). The user-input device may, for example, be a workstation coupled to the networks 116 or 122. In addition at action 352, the notification server 352 receives pager IDs of mobile computing devices to be communicated with when modifications to any documents identified by the list of document tokens is discovered. In response to actions 350 and 352, the notification server 141 at action 354 defines a lookup table to readily identify which mobile computing devices to notify once it is alerted to the modification of a document identified in the list of document tokens.

Subsequently at action 356, the notification server spawns a file watcher process 158 to watch the documents identified by the list of document tokens received at action 350. At action 358, the file watcher process intermittently queries the file server(s) that are identified as storing the documents specified in the list of document tokens. Once a modification to one of the documents being watched is discovered, the file watcher process notifies the notification server of the modification at action 360. Upon receipt of the notification of changes to the documents being watched, the notification server at action 362 notifies each mobile computing device 118 using the pager IDs set forth in the lookup table created at action 354. The mobile computing devices 118 are notified of the changes by transmitting a paging message through paging network 208 at action 364. The paging message, as described above, may be a simple pager text message or a document token command. If a document token command is received by the mobile computing device 118, the corresponding document tokens are either updated, deleted, or added by the document token command sent by the notification server at action 366. Whether a simple paging message or a document token command is received, the user of the mobile computing device is notified of the receipt of the paging message at action 368.

FIG. 4B illustrates the manner in which a user of the mobile computing device 118 outputs to a document service the modified document identified by the paging message received at action 368. More specifically, FIG. 4B illustrates a transaction protocol for printing the document using the token-to-print service that operates over an integrated wireless and wire-based communication service. The transaction protocol defines the actions to be performed by the token-enabled servers 126 for providing the token-to-print transaction service. More specifically, in response to a print request from a mobile computing device, the token-enabled server 126 recovers a document identified by a selected document token and directs it to be printed on a selected printer.

Figure 5:
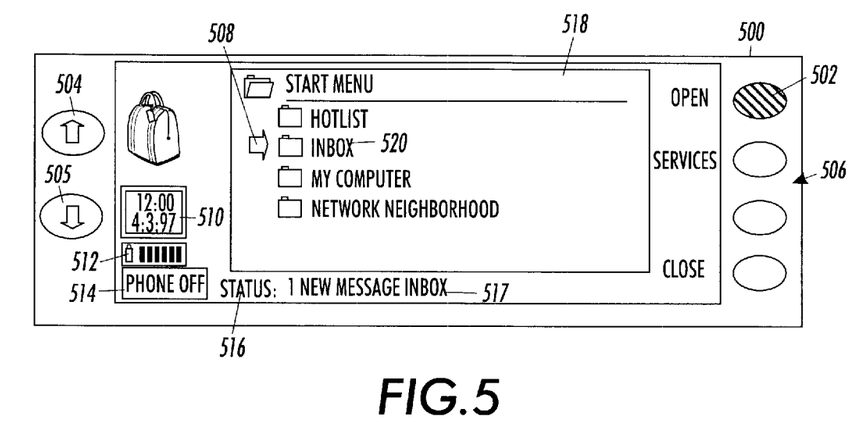
FIGS. 5–8 illustrate a user interface, which operates on a mobile computing device, for performing the user-specified operations of the protocol set forth in FIGS. 4A and 4B.

The transaction protocol for providing the token-to-print service is invoked by a user of the mobile computing device 118 by selecting a document token, as indicated by action 400. The action 400 is performed, for example, on a user interface 500 of the mobile computing device 118, which is shown in FIG. 5. More generally, FIGS. 5–8 illustrate a user interface that operates on the mobile computing devices 118 for performing user-specified operations set forth in FIGS. 4A and 4B. By way of overview, the user interface 500 includes scroll buttons 504 and 505, command buttons 506, selection indicator 508, time and date indicator 510, battery power indicator 512, field strength indicator 514, and operational status indicator 516.

In response to receiving a new message indicator 517, the user selects a document token from "Inbox" folder 520, which is accessible from the start menu screen 518 shown in FIG. 5. For simplicity, it is assumed that each document in the "Inbox" folder is a document token. Each document token consists of a reference to a document and not the contents of the document. Storing document tokens advantageously minimizes the memory requirements of the mobile computing devices 118, as well as the bandwidth required for transmitting information from a mobile computing device to other mobile computing devices or other computing devices that are coupled to networks 116 or 122. An example of a document token is a document URL (Uniform Resource Locator) which consists of three fields: a protocol field, a field with the DNS (Domain Name System) name of a host system, and a file name field.

Figure 6:
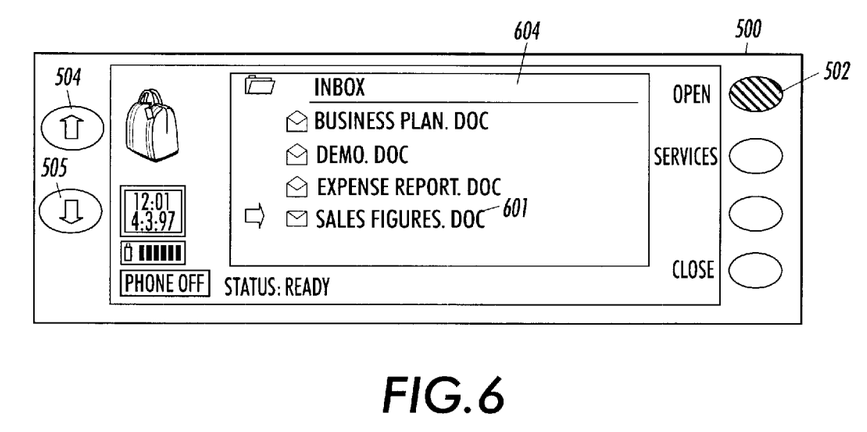

By selecting the "open" command button 502, the content of the "Inbox" folder is displayed in the display screen 604 shown in FIG. 6. Although the information for displaying the content is local to the mobile computing device, the device may automatically or in response to a command re-synch its content with the content of the user's personal workstation 108. In one embodiment, the content of the personal workstation of a user is mirrored on the display screen of the mobile computing device. Tokens are implicitly constructed as a mobile computing device browses files and folders accessible via the token-aware document server 126. A mobile computing device implicitly constructs a token by assembling filename, host name, protocol, and security information about a document.

Figure 7:
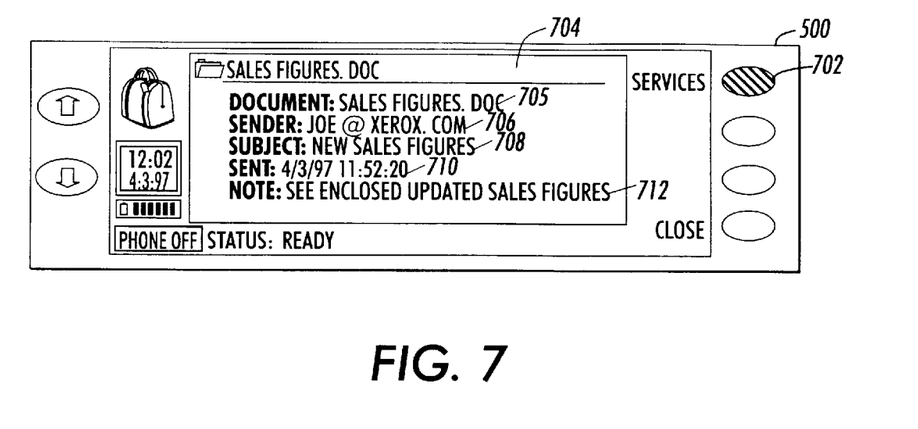

From the display screen 604, the user selects unopened document token message 601 shown on mobile computing device 118 using scroll buttons 504 or 505. The unopened document token message 601 corresponds to the new message received indicated by the new message indicator 517. Once the document token 601 is selected, the user then selects the "Open" button 502 as shown in FIG. 6. FIG. 7 illustrates an example of an opened document token message 601 or, more generally, paging message. The paging message in this example includes a document token name 705, a sender name 706, a subject name 708, a time 710 indicating when the message was sent, and a text message 712. If the user of the mobile computing device wishes to print the document on a printer enabled with an IR gateway 114 as illustrated in FIG. 2, then the user then presses the services button 702.

Responsive to the action 402 of pressing the services button for the document selected at action 400, mobile computing device 118 transmits a request for a list of available transaction services for that user at action 404, as shown in FIG. 4B. The request is transmitted to wire-based networks 116 and 122 through either gateway 114 or 120. Since the request for available services at action 404 is transmitted through one of the IR gateways 114, a location context is appended by context insertion sliver 115 at action 408; otherwise, no context information is appended to the request for available services at action 404 at the RF gateway 120 as shown in FIG. 4B by arrow 406.

Transmissions from mobile computing devices 118 that are received by either gateway 114 or 120 are transmitted to an available transaction server 144. Upon receipt of a request for available services, the transaction server 144 transmits a request at action 410 using available context information provided by the directory server 142. Responsive to the request, the directory server 142 provides the transaction server 144 with a list of available document transaction services at action 412. More details of context sensitive responses to requests for lists of available services are disclosed in U.S. patent application Ser. No. 09/270,641, entitled "System For Generating Context-Sensitive Hierarchically Ordered Document Service Menus". Subsequently, the transaction server 144 transmits to the network gateway 144, at action 414, a list of available services that reflects location-context information if available. Upon receipt, the network gateways 114 and 120 communicate the information relating to available services to mobile computing device 118 at action 418.

Figure 8:
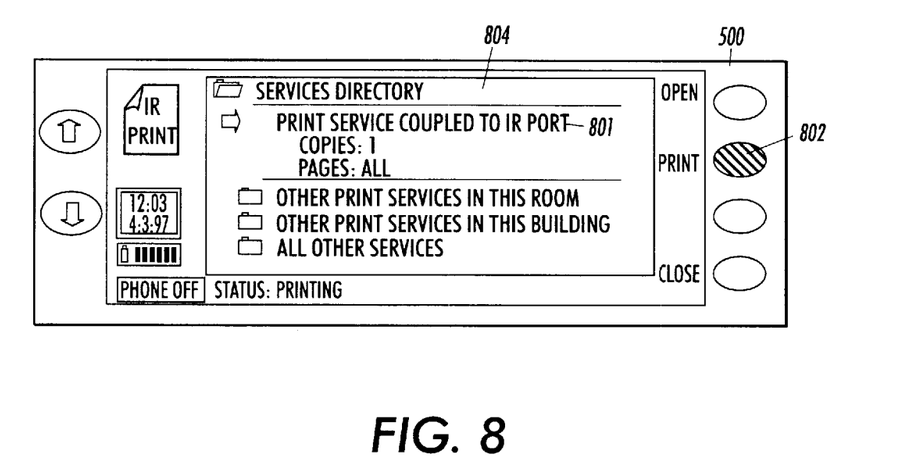

Once a list of available services is received at the mobile computing device 118, the "Services Directory" screen 804 shown in FIG. 8 is presented at user interface 500. After being presented with display screen 804, a user invokes the print command button 802 while selecting print service 801 at user action 420. In the example shown in FIG. 8, the user selected the print service 801 that is coupled to the IR port to which the mobile computing device is communicating with. Responsive to selection of command 802, mobile computing device 118 returns to either display screens 518 or 604, which are shown in FIGS. 5 and 6 respectively. A user of the mobile computing device 118 can retrieve progress of any document transaction service requested by opening a service request status log (not shown).

At action 422, the mobile computing device 118 transmits the request specified by the user in display screen 804 (shown in FIG. 8). Upon receipt of the service request, the IR network gateway 114 appends location-context information at action 426 (while the RF gateway 120 does not append context information at 424) before transmitting the received service request to the transaction server 144. Subsequently at action 428, the transaction server 144 transmits the service request for performing the token-to-print service on a selected document token to the token-aware document delivery server 138. At action 430, the token-aware document delivery server 138 requests that the document be fetched from a token-aware document server, which in this example is the token-aware shared document server 134.

Initially at action 431, the token-aware shared document server 134 locates elements of the token received from the token-aware document delivery server 138. The token elements that are located at action 431 include for example a document URL that identifies the name and location of a document. The token-aware shared document server 134 then authenticates document token at action 432. Part of the process of authenticating the document token is performing action 434 for acquiring the public key of the original user issuing the document token. Further details for authenticating elements of the token are disclosed in U.S. patent application Ser. No. 09/270,320, entitled "Secure Token-Based Document Server". Although not shown in FIGS. 4A or 4B, authentication of the document token can be performed at network gateways 114 and 120, the transaction server 144, and the token-aware personal document server 128.

After authenticating the token, the token-aware shared document server 134 fetches the document from its physical location on the network file server 104 or the like, at action 436. The fetched document is then forwarded to the token-aware document delivery server 138 at action 438. If necessary, the token-aware document delivery server 138 performs action 440 to convert the document acquired from the token-aware shared document server 134 into a format specified either by the sender or the selected print service using the conversion server 136. Finally, to complete the actions performed by the token-enabled servers 126 in performing the token-to-print transaction service, the document delivery server 138 sends the document acquired from the token-aware shared document server 134, in a print ready format, to the specified printer 102. It will be appreciated by those skilled in the art that the document retrieved at action 442 is either printed, faxed, emailed, or viewed depending on the service selected at step 402. In the event the document is faxed, the fax driver 148 transmits the document retrieved by the token-aware shared document server 134 over a telephone network (not shown) to a predefined phone number.

Figure 9:
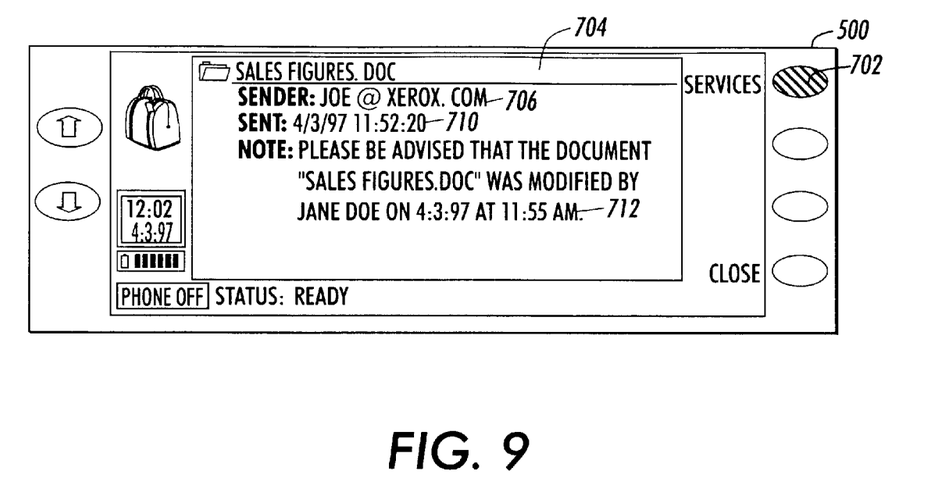
FIGS. 9 and 10 illustrate alternate embodiments for performing the mobile document paging service.
Figure 10:
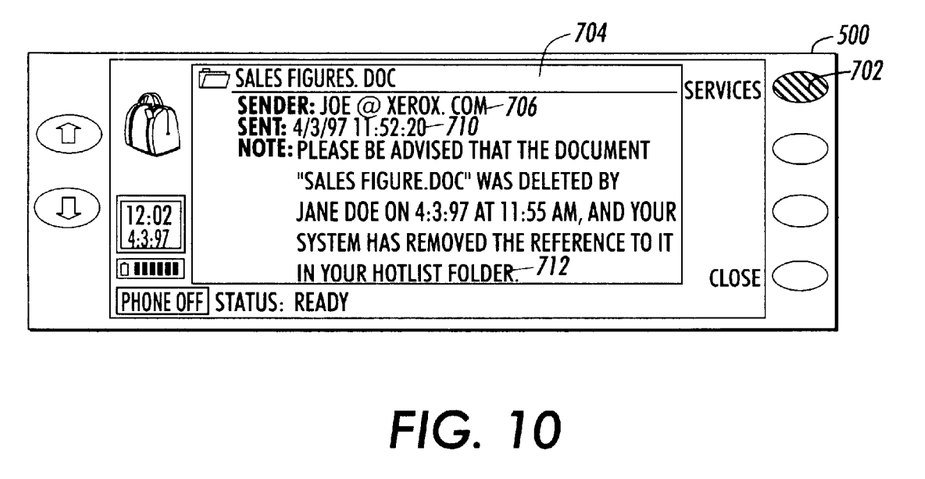

FIGS. 9 and 10 illustrate two alternate embodiments of paging messages. More specifically, FIG. 9 illustrates a paging message in which the text message field 712 indicates when and by whom a document, which was identified at action 350, was modified. The advantage of the paging message format illustrated in FIG. 9 is that the paging message need only be an ASCII message. Alternatively, FIG. 10 illustrates a paging message that is accompanied by a document token command. The document token command in this example automatically updates the token on the mobile computing device in response to the deletion by another user of the actual document. Advantageously, such document token commands automatically update the document tokens on mobile computing devices so that they are consistent with the documents in a file space 202 that is shared by multiple users.

In yet another embodiment (not shown), document paging messages are specified either partially or entirely using audio data. In this alternate embodiment, pager IDs are used to identify voice mailboxes or the like. An audio message specifying a document paging message can, for example, include information that identifies a modified document and its physical location (e.g., a URL). Other more complex voice messages can be generated that include information that identify specific changes in a modified document.

F. Summary

It will be appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for operating a token-enabled server coupled to a network, comprising the steps of:

receiving a first set of data identifying a set of mobile computing devices; said receiving step providing the token-enabled server with addresses for communicating with each mobile computing device in the set of mobile computing devices over a wireless communications transceiver system;

receiving a second set of data identifying a set of document elements; the set of document elements defining locations of documents stored on the network;

defining a lookup table using the first set of data and the second set of data; the lookup table associating at least one document element in the set of document elements with at least one address identifying one of the mobile computing devices in the set of mobile computing devices;

spawning a process for monitoring modifications to documents identified by the set of document elements;

observing, using the spawned process, a modification to one of the documents identified by the set of document elements;

selecting, using the lookup table, each mobile computing device associated with the document element corresponding to the modified document;

notifying the selected mobile computing devices with a message identifying the modified document specified by the document element; wherein said notifying step further comprises the step of transmitting a document token identifying the modified document stored on the network to the selected mobile computing devices; and receiving from ones of the selected mobile computing devices a request to transmit the document identified by the document token to a document services device coupled to the network after receiving notification of the modification to the document; said receiving step causing the modified document specified by the document element from the database to be output to a network device providing the requested document service.

2. The method according to claim 1, further comprising the step of retrieving the modified document specified by the document element from a file server coupled to the network.

3. The method according to claim 2, wherein the modified document is output to a printer coupled to the network.

4. The method according to claim 2, wherein the modified document is output to an audio-visual view station coupled to the network.

5. The method according to claim 1, further comprising the step of receiving the set of document elements from an input device coupled to the network.

6. The method according to claim 1, wherein said step of receiving the first set of data further comprises the step of providing the token-enabled server with pager IDs for communicating with each mobile computing device in the set of mobile computing devices.

7. The method according to claim 1, wherein said step of receiving the second set of data comprises the step of receiving a set of document elements that identify document tokens of documents stored on the network.

8. The method according to claim 1, wherein said step of receiving the second set of data comprises the step of receiving a set of directory locations of documents stored on the network.

9. The method according to claim 1, further comprising the step of embedding a command for updating the document token on the selected mobile computing devices; wherein the command performs one of updating, deleting, and adding the document token on the mobile computing device.

10. A token-enabled server coupled to a network, comprising:

means receiving a first set of data identifying a set of mobile computing devices; said receiving means providing the token-enabled server with addresses for communicating with each mobile computing device in the set of mobile computing devices over a wireless communications transceiver system;

means for receiving a second set of data identifying a set of document elements; the set of document elements defining locations of documents stored on the network;

means for defining a lookup table using the first set of data and the second set of data; the lookup table associating at least one document element in the set of document elements with at least one address identifying one of the mobile computing devices in the set of mobile computing devices;

means for spawning a process for monitoring modifications to documents identified by the set of document elements;

means for observing, using the spawned process, a modification to one of the documents identified by the set of document elements;

means for selecting, using the lookup table, each mobile computing device associated with the document element corresponding to the modified document;

means for notifying the selected mobile computing devices with a message identifying the modified document specified by the document element; wherein said notifying means further comprises means for transmitting a document token identifying the modified document stored on the network to the selected mobile computing devices; and means for receiving from ones of the selected mobile computing devices a request to transmit the document identified by the document token to a document services device coupled to the network after receiving notification of the modification to the document; said receiving step causing the modified document specified by the document element from the database to be output to a network device providing the requested document service.

11. The token-enabled server according to claim 10, further comprising means for retrieving the modified document specified by the document element from a file server coupled to the network.

12. The token-enabled server according to claim 11, wherein the modified document is output to a printer coupled to the network.

13. The token-enabled server according to claim 11, wherein the modified document is output to an audio-visual view station coupled to the network.

14. The token-enabled server according to claim 10, further comprising means for receiving the set of document elements from an input device coupled to the network.

15. The token-enabled server according to claim 10, wherein said means for receiving the first set of data further comprises means for providing the token-enabled server with pager IDs for communicating with each mobile computing device in the set of mobile computing devices.

16. The token-enabled server according to claim 10, wherein said means for receiving the second set of data comprises means for receiving a set of document elements that identify document tokens of documents stored on the network.

17. The token-enabled server according to claim 10, wherein said means for receiving the second set of data comprises means for receiving a set of directory locations of documents stored on the network.

18. The token-enabled server according to claim 10, further comprising means for embedding a command for updating the document token on the selected mobile computing devices; wherein the command performs one of updating, deleting, and adding the document token on the mobile computing device.

* * * * *